F. J. MOSER.
REEL.
APPLICATION FILED AUG. 16, 1909.
964,116.
Patented July 12, 1910.
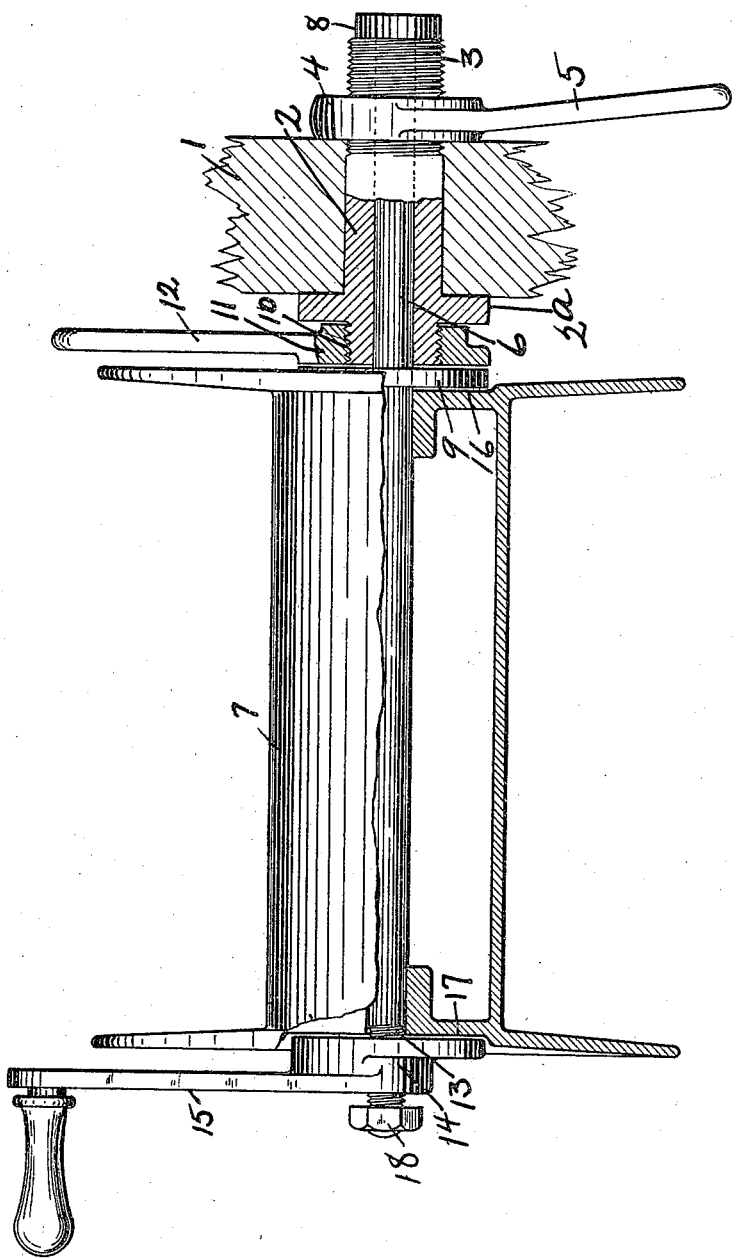
Witnesses
Margaret Bugle
Vinnie C. Hise
Inventor
Fred Jozeph Moser
by
Attorney

UNITED STATES PATENT OFFICE.

FRED JOSEPH MOSER, OF KANE, PENNSYLVANIA.

REEL.

964,116.　　Specification of Letters Patent.　Patented July 12, 1910.

Application filed August 16, 1909. Serial No. 512,958.

*To all whom it may concern:*

Be it known that I, FRED J. MOSER, a citizen of the United States, residing at Kane, in the county of McKean and State of Pennsylvania, have invented new and useful Improvements in Reels, of which the following is a specification.

This invention relates to reels, and consists in certain improvements in the construction thereof as will be hereinafter fully described and pointed out in the claims.

More particularly, the invention relates to a reel which is peculiarly adapted for handling measuring lines in deep wells, and in some respects is an improvement over that shown in my patent dated June 1st, 1909, No. 923,559.

The invention is illustrated in the accompanying drawing, wherein is shown an elevation of the device, partly in section.

1 marks a beam forming a support for the reel. A sleeve 2 extends through this beam. The sleeve is provided with the shoulder 2ª at one end, and screw threads 3 at the other end. A nut 4 is arranged on the screw threads 3, and is provided with a handle 5 for clamping the sleeve on the beam. A supporting shaft 6 is journaled in the sleeve 2. The spool 7 is journaled on this shaft.

The shaft has a shoulder 8 at the end of the sleeve, and a second shoulder 9 fixed to the shaft at the spool end of the sleeve. The sleeve has a screw threaded extension at the spool end on which is arranged a nut 11. This nut is provided with an operating handle 12. By operating the nut 11, it may be pressed against the collar or shoulder 9, so as to lock the shaft 6 against rotation. The shaft has the screw thread 13 at its outer end, on which is arranged a nut 14, the nut being provided with a crank 15. The spool has the friction surfaces 16 and 17 adapted to act against the shoulder 9 and the nut 14, respectively. A nut 18 is provided to prevent the accidental disengagement of the nut 14 from the shaft.

The operation of the device is as follows: When it is desired to run the tape into the well, the shaft 6 is set by means of the nut 11, and the speed of the spool may be controlled by operating the crank 15, the nut 14 acting on the friction surface 17, and crowding the spool against the shoulder 9. In the same way the spool may be stopped at any desired point. When it is desired to wind up the tape, the shaft is locked by the nut 11, and the crank turned sufficiently to clamp the spool between the shoulder 9 and the nut 14. The nut 11 is then released, and the spool turned by means of the crank 15, the shaft 6 turning in the sleeve 2.

What I claim as new is:

1. In a reel the combination of a sleeve; a shaft journaled in the sleeve, said shaft being locked against axial movement in one direction; a shoulder on the shaft; means mounted on the sleeve, and acting against the shoulder for locking the shaft with the sleeve; a spool mounted on the shaft; a crank; and means for locking the crank with the spool.

2. In a reel the combination of a sleeve, a shaft journaled in the sleeve, said shaft being locked against avial movement in one direction; a shoulder on the shaft; means mounted on the sleeve, and acting against the shoulder for locking the shaft with the sleeve; a spool mounted on the shaft; a crank; and means for locking the crank with the spool comprising means for braking the spool.

3. In a reel the combination of a sleeve forming the bearing for an overhanging shaft; means on the sleeve for securing it to the support; a shaft supported by and adapted to turn in said sleeve; a spool mounted on said shaft; means for locking the shaft to said sleeve, and releasing it therefrom; a crank; and means actuated by the crank for locking and releasing the spool from the shaft and crank.

4. In a reel the combination of a sleeve forming a bearing for an overhanging shaft; a shaft supported by the sleeve and extending therefrom, adapted to turn in the bearing; a spool mounted on said shaft; a crank mounted on said shaft; means for locking the shaft, spool and crank together by the movement of the crank in one direction, and releasing the spool by the movement of the crank in the opposite direction; means attached to said sleeve for locking the shaft to the bearing and releasing it therefrom; and means on the sleeve for securing it to a support.

In testimony whereof, I have hereunto set my hand in the presence of two subscribing witnesses.

FRED JOSEPH MOSER.

Witnesses:
　GEORGE J. SMITH,
　WILLIAM J. EVANS.